United States Patent [19]

Chatani et al.

[11] Patent Number: 5,294,676
[45] Date of Patent: Mar. 15, 1994

[54] METHACRYLIC RESIN COMPOSITIONS WITH IMPROVED TACKY ADHESION AND METHOD FOR PREPARATION THEREOF

[75] Inventors: Michio Chatani; Tadayuki Tsuchiya; Kazuo Ohse; Akio Hara, all of Nakajo, Japan

[73] Assignee: Kuraray Co., Ltd., Kurashiki, Japan

[21] Appl. No.: 516,927

[22] Filed: Apr. 30, 1990

[30] Foreign Application Priority Data

May 9, 1989 [JP] Japan .................................. 1-115634
May 9, 1989 [JP] Japan .................................. 1-115635

[51] Int. Cl.$^5$ .......................................... C08F 265/06
[52] U.S. Cl. ..................................... 525/305; 525/226
[58] Field of Search ................................. 525/305, 226

[56] References Cited

U.S. PATENT DOCUMENTS

| | | | |
|---|---|---|---|
| 3,671,610 | 6/1972 | Amagi et al. | 525/305 |
| 3,922,321 | 11/1975 | Yusa et al. | 525/305 |
| 4,134,930 | 1/1979 | Kubota | 525/305 |
| 4,288,570 | 9/1981 | Coran et al. | 525/404 |
| 4,529,777 | 7/1985 | Daidone | 525/305 |
| 4,791,184 | 12/1988 | Nagai et al. | 526/323.2 |
| 4,999,402 | 3/1991 | Yamamoto et al. | 525/305 |

OTHER PUBLICATIONS

World Patents Index Latest, Derwent Pub., Ltd. GN AN 87-139965; JP-A-62-079 206 (Kyowa Gas Chem Ind.) Apr. 11, 1987.
World Patents Index, Derwent Pub., Ltd., GB, AN 89-013715; JP-A-63-291 027 (Kyowa Gas Chem. Ind.) Nov. 29, 1988.
World Patents Index Latest, Derwent Publ., GC, AN 88-245763 JP-1 63 178 116 (Kyowa Gas Chem Ind.) Jul. 22, 1988.
World Patents Index, Derwent Publications, Ltd. AN 88-075333 JP-A-63 030 511 (Kyowa Gas Chem. Ind.) Feb. 9, 1988.
World Patents Index Latest, Derwent Publications Ltd., AN 87-068070 JP-A-62 020 513 (Kyowa Gas Chem Ind) Jan. 29, 1987.
European Search Report Against EP 90 10 8595.

*Primary Examiner*—Vasu S. Jagannathan
*Attorney, Agent, or Firm*—Oblon, Spivak, McClelland, Maier & Neustadt

[57] ABSTRACT

A methacrylic resin composition with improved tacky adhesion comprising 100 parts by weight of a partially cross-linked polymer gel obtained by partially polymerizing a mixture comprising (A) 40 to 99% by weight of unsaturated monomer mixtures with or without containing the polymers thereof dissolved and (B) 60 to 1% by weight of a cross-linking agent, thereby allowing the total polymer content to be kept not exceeding 80% by weight, and increased by 4 to 62% by weight over the polymer content of said mixture, and 1 to 100 parts by weight of a syrup mainly composed of alkyl methacrylates containing the polymers thereof dissolved.

8 Claims, No Drawings

METHACRYLIC RESIN COMPOSITIONS WITH IMPROVED TACKY ADHESION AND METHOD FOR PREPARATION THEREOF

BACKGROUND OF THE INVENTION

1. Field of the Invention

This invention relates to a methacrylic resin composition with improved tacky adhesion and to a method for the preparation thereof, and more particularly to an improved adherent methacrylic resin composition to obtain cross-linked molded articles such as molded products, laminated moldings and coated materials, and to an improved method for the preparation thereof.

2. Description of the Prior Art

Generally, methacrylic resins formed predominantly of methyl methacrylate have found use in covers of lamps, parts for automobiles, sign-boards, ornamental articles, sundry goods etc. because of their excellent weatherability and outstanding transparency. Since the aforementioned methacrylic resins are linear polymers, they have some disadvantages that they are deficient in resistance to heat, to solvents, to shock and to surface hardness.

For example, the methacrylic resins are heat resistant up to about 100° C. at most so that they are inadequate at present to meet specific requirements in various applications demanding higher temperature resistances.

In the case of parts for automobiles, the methacrylic resins can not be used for head lamp covers because of their inadequate heat resistances. In the case of tail lamps, since the amount of heat generation has been increasing due to the increase in lamp size and illumination and the shifting to smaller thickness of the lamp covers required for cost cut, the necessity of improving heat resistance of the lamp covers is becoming more marked.

The methacrylic resins are expected to find growing applications in parts such as covers for meters on automobiles and two-wheelers and covers for water heaters using solar thermal energy which by nature experience great elevation of temperature under direct exposure to the sunlight. Thus, the development of a methacrylic resin resistant to higher temperatures than the boiling point of water is longed for.

For the purpose of conferring an improved heat resistance to a methacrylic resin, there have been proposed various methods. Recently, U.S. Pat. No. 4,791,184 discloses a methacrylic resin molding material comprising a partially cross-linked polymer gel which is apt to do moldings required to flow such as injection moldings, extrusion moldings and transfer moldings. The methacrylic resin molding material can give cross-linked molded articles with excellent resistances to heat, solvents etc. without degrading transparency.

Since the methacrylic resin molding material, however as described in the patent specification, is non-sticky and shape-retaining, in the case of kneading to improve fluid properties, a partially cross-linked polymer gel with a higher polymer content or a partially cross-linked polymer gel obtained by partially polymerizing by a mixture of monomers alone has the problem of being difficult to handle because it is in the form of loose separate fine particles. In the case of preforming into the corresponding shape of a complexed molding article or feeding of molding material into a complexed shaped mold, there is a problem that the retaining of preformed shape is difficult or the molding material feeding is complicated.

In the case of blending fillers such as inorganic powders comprising aluminum hydroxide, alumina, silica, talk, calcium carbonate etc., glass fibers and wood powders to the aforementioned molding materials, it is difficult to mix homogeneously because of the non-sticky characteristics of the molding materials. Especially, in the case of using mixed dispersively or kneaded partially cross-linked polymer gel obtained partially polymerizing a mixture of monomers alone, the molded products tend to have cracks because of the heterogeneous mixing occurred depending on the amount of blended fillers.

For the purpose of obtaining a laminated molding consisting of a methacrylic resin sheet adhered to the same methacrylic resin or other resin sheets, there have been used (a) a method using a volatile organic solvent capable of dissolving the resin (Japanese Patent Publication No. SHO 60(1985)-56177), (b) a method using an adhesive prepared by admixing a polymerizable material selected from the group consisting of methyl methacrylate monomer, a monomer mixture predominantly consisting of methyl methacrylate, and a partial polymer thereof, with an amine and an catalyst thereof (Japanese Patent Publication No. SHO 62(1987)-42951).

However, these methods have a problem such that the adhesive solutions tend to generate small bubbles on adhesive interfaces or in thick adhesive layers, to develop color in adhesive layers, and to smell strongly, and require special skills for the preparation and application of these adhesives.

Also these methods have a disadvantage that the adhesive solutions can not bond or can only weakly bond plastic materials resistant to solvents, especially cross-linked plastic materials because swelling or dissolving with the solutions of the bonding surface of the methacrylic resin to be bonded is the base for bonding by these methods.

In many applications, methacrylic resins have been coated on various different plastics and decorative materials for transparent and decorative surface finishing.

Conventionally various methods for coating have been proposed, e.g. (c) a method for preparing a coated product by impregnating a syrup consisting of methyl methacrylic monomer and linear polymer thereof, and pressuring and compressing (Japanese Patent Laid-open No. SHO 49(1974)-1,94804), (d) a method for preparing a coated product by laminating a methacrylic resin sheet on a decorative sheet by heating and pressing (Japanese Patent Laid-open No. SHO 47(1972)-11396), and (e) a method preparing a coated material by applying a methacrylic resin film on a surface of an uncured substance containing polymerizable monomers and solvents, and heating and polymerizing the uncured substance (Japanese Patent Laid-open SHO 57(1982)-135122).

However, the surface of the above-mentioned coated articles has insufficient resistance to heat and to solvents because the methacrylic resin constituting the coating is a linear polymer. Further, the method of impregnating a syrup (c) is superior in adhesion, but has difficulties to get a heavy thickness of coating and needs complicated processes. The method of using a methacrylic resin sheet (d) or film (e) can get a thick coating layer, but needs additional complicated processes to prepare the sheet or film previously and the products are deficient in adhesion in some cases.

An object of this invention, therefore, is to provide a novel methacrylic resin molding material having superior characteristics such as improved tacky adhesion, easy handling and homogeneous mixing of fillers, and a method for preparation thereof.

Another object of this invention is to provide an adhesive overcoming these disadvantages such as forming of small bubbles on adhesive interface, developing color, strong smelling, and requiring special skills, more particularly to provide an adhesive capable of bonding plastics resistant to solvents.

A further object of this invention is to provide a coating material having a good permeability and fluidity comparable to syrup, and easy-to-handle, more particularly to provide a coating material forming a coating layer resistant to heat and to solvents, having superior adhesion, and capable of easily control of coating thickness.

SUMMARY OF THE INVENTION

The objects described above are attained firstly by a methacrylic resin composition with improved tacky adhesion comprising 100 parts by weight of a partially cross-linked polymer gel obtained by partially polymerizing a mixture comprising (A) 40 to 99% by weight of unsaturated monomer mixtures mainly composed of alkyl methacrylates with or without containing the polymers thereof dissolved and (B) 60 to 1% by weight of a cross-linking agent, thereby allowing the total polymer content to be increased by 4 to 62% by weight over the polymer content of the mixture and to be kept not exceeding 80% by weight, and 1 to 100 parts by weight of a syrup mainly composed of alkyl methacrylates containing the polymers thereof dissolved.

The aforementioned objects are attained secondly by a method for preparation of methacrylic resin composition with improved tacky adhesion obtained by mixing dispersively or kneading 100 parts by weight of a partially cross-linked polymer gel, which comprises of partially polymerizing a mixture comprising (A) 40 to 99% by weight of unsaturated monomer mixtures mainly composed of alklyl methacrylates with or without containing the polymers thereof dissolved and (B) 60 to 1% by weight of a cross-linking agent in the presence of a polymerization initiator, thereby allowing the total polymer content to be increased by 4 to 62% by weight over the polymer content of the mixture and to be kept not exceeding 80% by weight, and 1 to 100 parts by weight of a syrup mainly composed of alkyl methacrylates containing the polymers thereof dissolved.

DESCRIPTION OF PREFERRED EMBODIMENTS

In the present invention, (A) the unsaturated monomer mixtures mainly composed of alkyl methacrylates with or without containing the polymers thereof dissolved include alkyl methacrylates alone, mixtures mainly composed of alkyl methacrylates with other a α,β-ethylenically unsaturated monomers copolymerizable therewith, and syrups composed of said monomers or said monomer mixtures containing the polymers thereof dissolved.

Examples of alkyl methacrylate include methyl methacrylate, ethyl methacrylate, n-propyl methacrylate, isopropyl methacrylate, n-butyl methacrylate, sec-butyl methacrylate, tert-butyl methacrylate, lauryl methacrylate, cyclohexyl methacrylate, dicyclopentenyl methacrylate and the like alone or mixtures thereof. Among above alkyl methacrylates, lower alkyl methacrylates having 1 to 4 carbon atoms in alkyl group are more desirable and methyl methacrylate is most desirable.

Examples of the copolymerizable monomer include alkyl acrylates such as methyl acrylate, ethyl acrylate, n-propyl acrylate, isopropyl acrylate, n-butyl acrylate, 2-ethylhexyl acrylate, cyclohexyl acrylate, lauryl acrylate, dicyclopentenyl acrylate and the like, hydroxyalkyl acrylates such as 2-hydroxyethyl acrylate, 2-hydroxypropyl acrylate, 3-hydroxybutyl acrylate and the like, hydroxyalkyl methacrylates such as 2-hydroxyethyl methacrylate, 2-hydroxypropyl methacrylate, 4-hydroxybutyl methacrylate, 2-hydroxyl-3-chloropropyl methacrylate and the like, acrylic acid, methacrylic acid, salts of acrylic acid such as neodymium acrylate, lead acrylate and the like, salts of methacrylic acid such as neodymium methaerylate, lead methacrylate and the like, vinyl chloride, vinyl acetate, acrylonitrile, methaerylonitrile, acrylamide, methaerylamide, styrene, α-methyl styrene, vinyl toluene, maleic anhydride etc.

The syrup containing the polymer of alkyl methacrylates or of the monomer mixture mainly composed of alkyl methacrylates is generally a monomer solution having a viscosity in the range of 1 to 30,000 centipoises preferably in the range of 5 to 10,000 centipoises at 25° C., and containing a polymer concentration in the range of 3 to 40% by weight, preferably in the range of 6 to 30% by weight.

The cross-linking agent (B) to be used in the present invention is preferably a cross-linkable monomer containing at least two (meth)acryloyl groups in the molecule and having 10 or less carbon atoms between the aforementioned (meth)acryloyl groups, such as a monomer represented by any of the following general formula:

$$MA-O-(CH_2)_n-O-MA \quad (1)$$

wherein n denotes an integer of 3 to 6, and MA denotes a

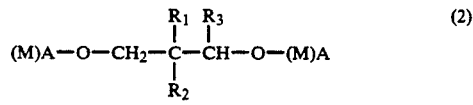

$$(M)A-O-CH_2-\underset{\underset{R_2}{|}}{\overset{R_1}{\overset{|}{C}}}-\overset{R_3}{\underset{|}{CH}}-O-(M)A \quad (2)$$

wherein R, denotes H, $CH_3$, $C_2H_5$, or $CH_2OH$, and $R_2$ denotes H, $CH_3$,

$$\overset{R_4}{\underset{|}{CH_2OCOC}}=CH_2$$

(wherein $R_4$ denotes H or $CH_3$) or $CH_2OH$, $R_3$ denotes H or $CH_3$, $R_1$, $R_2$ and $R_3$ do not denote hydrogen atom all at the same time, and (M)A denotes a methacryloyl group or acryloyl group,

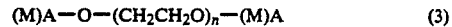

$$(M)A-O-(CH_2CH_2O)_n-(M)A \quad (3)$$

wherein n denotes an integer of 1 or 2, and (M)A denotes methaeryloyl group or acryloyl group.

Examples of the monomer include 1,3-propylene glycol dimethaerylate, 1,4-butylene glycol dimethaerylate, 1,6-hexanediol dimethacrylate, 1,3-butylene glycol dimethacrylate, dimethylol ethane dimethacrylate, 1,1-dimethylol propane dimethacrylate, 2,2-dimethylol propane dimethacrylate, trimethylol ethane tri(meth)acrylate, trimethylol propane tri(meth)acrylate, tetramethylol methane tri(meth)acrylate, tetramethylol methane dimethacrylate, ethylene glycol di(meth)acrylate, diethylene glycol di(meth)acrylate and the like. Among these cross-linkable monomers, the monomers of the general formula (2) are preferable, and 2,2-dimethylol propane dimethaerylate (neopentyl glycol dimethacrylate) is particularly preferable in terms of transperency and flowability.

The amount of the cross-linking agent (B) to be used is in the range of 1 to 60% by weight, preferably 2 to 50% by weight, more preferably 4 to 30% by weight. If the amount of the cross-linking agent (B) is less than 1% by weight, the molded article finally prepared fails to show any discernible improvement in resistance to heat and to solvents. If the amount is more than 60% by weight, the molded article finally obtained is not only too brittle to withstand practical uses but also unpreferably deficient in flowability.

The partially cross-linked polymer gel according to the present invention is a gel partial polymer which is obtained by beating the mixture of the unsaturated monomers (A) mainly composed of alkyl methacrylates with or without containing the polymers thereof dissolved and the cross-linking agent (B) in the presence of a polymerization initiator, and stopping the polymerization reaction at the step that one part of the monomer is polymerized but another part of the monomer is remaining unpolymerized.

In this case, the content of the polymer present in the partially cross-linked polymer gel is required to be increased 4 to 62% by weight, preferably 10 to 62% by weight, more preferably 15 to 62% by weight over the polymer content of the mixture of the aforementioned unsaturated monomers (A) and the cross-linking agent (B), and the total polymer content is kept not exceeding 80% by weight, preferably 62% by weight.

If the increased polymer content in the partially cross-linked polymer gel is less than 4% by weight, the product of the partially cross-linked polymer gel fails to form a gel state and is difficult to handle. If the total content exceeds 80% by weight, the product of the polymer gel fails to exhibit satisfactory flow during the molding work.

In the preparation of the partially cross-linked polymer gel in accordance with this invention, usual polymerization initiators selected from the group consisting of usual polymerization initiators active at low temperatures and usual polymerization initiators active at high temperatures can be used singly or mixed.

Generally, for the preparation of the partially cross-linked polymer gel polymerization, initiators active at low temperatures are advantageous and the use of a radical polymerization initiator formed of a peroxide and an azo compound having a decomposition temperature for obtaining a half life of 10 hours of 50° C. or less, preferable 26° to 45° C. , more preferably 26° to 41° C. is preferable. The amount of the polymerization initiator is required to fall in the range of 0.001 to 1% by weight, preferably 0.0015 to 0.1% by weight based on the total weight of the unsaturated monomer (A) and the cross-linking agent (B).

For the polymerization at molding conditions, in accordance with this invention, polymerization initiators active at high temperatures are advantageous and the use of a polymerisation initiator having a decomposition temperature for obtaining a half life of 10 hours of 60° to 220° C. is preferable. For the purpose of improving the molding cycle and ensuring the high storage stability, a polymerization initiator having a decomposition temperature for obtaining a half life of 10 hours of 60° to 170° C. is more preferable. The amount of the polymerization initiator active at elevated temperatures is required to fall in the range of 0.01 to 5% by weight, preferably 0.02 to 4% by weight based on the total weight of the aforementioned unsaturated monomers (A) and the aforementioned cross linking agent (B).

According to the present invention, the partially polymerized polymer gel is prepared by heating the mixture of the aforementioned unsaturated monomer (A) and the aforementioned cross-linking agent (B) in the presence of the polymerization initiator. This polymerization reaction is carried out at a temperature in the range of 10° to 100° C., preferably 35° to 90° C. for a period of 10 to 200 minutes, preferably 20 to 150 minutes. When the two polymerization initiators, one active at low temperatures and the other active at high temperatures, are used as combined, the former polymerization initiator active at low temperatures is substantially consumed but the latter polymerization initiator active at high temperatures remains almost unchanged because of its incapability of decomposition at the reaction temperature and is effected during the subsequent course of molding and coating.

According to the present invention, the polymerization initiator active at high temperatures can be added at the preparation of the partially cross-linked polymer gel with the polymerization initiator active at low temperatures, can be added at the mixing dispersively or kneading process by a kneader, extruder etc. after the preparation of the partially cross-linked polymer gel, or can be added to the syrup which is mixed dispersively or kneaded with the partially polymerized polymer gel for the improvement of the tacky adhesive characteristics and flowability.

The partially cross-linked polymer gel with a desired conversion rate of polymerization is obtained by rapid cooling of the reaction system to stop the polymerization reaction. Further, the desired partially cross-linked polymer gel can be easily obtained by adding a following regulating agent to the mixture of the aforementioned unsaturated monomer (A) and the cross-linking agent (B) with the aforementioned polymerization initiator for polymerization by heating. Examples of the regulating agents usable for this purpose include 1,4(8)-p-menthadiene, 2,6-dimethyl-2,4,6-octatriene, 1,4-p-menthadiene, 1,4-cyclohexadiene and α-methyl styrene dimer.

The regulating agent is added in an amount falling in the range of 0.0001 to 0.5% by weight, preferably in the range of 0.001 to 0.2% by weight, more preferably in the range of 0.005 to 0.1% by weight based on the total amount of the aforementioned unsaturated monomer (A) and the cross-linking agent (B). The mixture of starting materials before polymerization for the preparation of the partially cross-linked polymer gel may be incorporated, as required, with various additives such as chain transfer agent, coloring agent, fillers, parting agent, ultraviolet light absorber, light stabilizer etc.

The partially cross-linked polymer gel of the present invention can be handled in various shapes such as sheet, rod, block, pellet etc. because of the non-sticky and shape-retaining properties, but which flows on the application of shear stress at normal temperature or at elevated temperatures, and further which can be mixed dispersively or kneaded to increase the flowability.

The partially cross-linked polymer gel can be easily mixed dispersively or kneaded into the particles having an average particle diameter of 5 mm or less, preferably 2 mm or less having a very stable flowability by kneaders such as screw roll, calender roll etc. in the case of low total polymer content of less than 50% by weight, and by mills such as ball mill, cutter mill etc. in the case of high total polymer content.

The methacrylic resin composition with improved tacky adhesion in the present invention comprising of 100 parts by weight of the aforementioned partially cross-linked polymer gel obtained by partially polymerizing the mixture comprising the unsaturated monomer mixtures (A) mainly composed of alkyl methacrylate with or without containing the polymer thereof dissolved and the cross-linking agent (B) in the presence of the polymerization initiator, stopping the polymerization reaction at the step that a part of the monomer is polymerized but all the monomer is not polymerized, and 1 to 100 parts by weight of the syrup mainly composed of alkyl methacrylate containing the polymers thereof dissolved shows preferably a tacky adhesion of 30 to 900 g/cm$^2$.

The aforementioned composition can be prepared by mixing dispersively or kneading of 100 parts by weight of the aforementioned partially cross-linked polymer gel or its mixed dispersively or kneaded partially cross-linked polymer gel with 1 to 100 parts by weight, preferably 10 to 50 parts by weight of the syrup mainly composed of alklyl methacrylates containing the polymers thereof dissolved, which imparts the following preferable effects:

(i) The regulation of flowability by the addition of the syrup capable of increasing the flowability,
(ii) The regulation of tacky adhesion by the addition of the syrup capable of imparting adhesion,
(iii) The easy preforming and easy handling of the preforms,
(iv) The improved kneading of fillers,
(v) The homogeneous coloring and easily preventing flow and flecking patterns by adding the syrup mixed with dyes or pigments to partially cross-linked polymer gel mixed dispersively or kneaded.

If more than 100 parts by weight of the syrup is added, the composition becomes uncapable of retaining the shape, which is unpreferable. The aforementioned syrup mainly composed of alkyl methacrylates with or without containing the polymers thereof dissolved means a syrup containing the polymers of the aforementioned alkyl methacrylates or the monomer mixtures mainly composed of alkyl methacrylates, having a viscosity of 4 to 50 poises at 25° C., preferably 6 to 20 poises which can contain a cross-linkable monomer of 60% or less by weight as required, preferably contain a cross-linkable monomer of the same concentration of the partially cross-linked polymer gel.

The substantially homogeneous kneading by the addition of the syrup followed by mixing dispersively or kneading is attained by the use of an aforementioned kneader or mill when the partially cross-linked polymer gel has not been mixed dispersively or kneaded, and is attained by the stirrers such as super mixer, Henschel mixer etc. when the partially cross-linked polymer gel has been mixed dispersively or kneaded. In this case, "substantially homogeneous kneading" means that the syrup kneaded in the composition by the aforementioned method does not be separated and flowed, and which state is attained by stirring for a period of a few to about ten minutes by a stirrer.

The composition thus obtained has preferably a tacky adhesion in the range of 30 to 900 g/cm$^2$, more preferably 50 to 700 g/cm$^2$ measured by the following method using the following apparatus. If the tacky adhesion is less than 30 g/cm$^2$, the preformed shape tends to be unretained for weak tacky adhesion. If the tacky adhesion is more than 900 g/cm$^2$, the handling of the composition tends to be difficult because of sticking hardly to packing material, container wall etc.

Adhesion force is measured in the condition that the sample is held between PARALINX TS-20, a molded cross-linked methacrylic resin casting sheet (manufactured by Kuraray Co., Ltd.) and a nylon sheet with an adhesive layer thickness of 0.3 mm and an area of 40×40 mm pressed by a load of 10 kg, by an adhesion tester (Precision dynamo guage PG-10, manufactured by Marubishi Kagaku Kikai Seisakusho).

In the case of mixing dispersively or kneading the partially cross-linked polymer gel, in the case of mixing dispersively or kneading said gel and the syrup, or in the case of mixing dispersively the partially cross-linked polymer gel with mixing dispersively or kneading and the syrup, additives such as parting agent, coloring agent, fillers, ultraviolet light absorber, light stabilizer etc. can be compounded at a time or separately.

As described above, the methacrylic resin compositions according to the present invention are useful for the preparation of moldings resistant to heat and to solvents with excellent transperency because the compositions are comparable with syrup in tacky adhesion and flowability. The molding materials composed of the compositions can be preferably applied for the preparation of moldings with complexed shape because of the excellent moldability owing to the superior flowability and easy-to-handle.

The molding compositions can be molded by compression molding, extrusion molding, transfer molding etc. For example, the molding compositions according to the present invention can be molded to prepare a molded article of a desired shape by setting the molding composition in a metal mold cavity, heating and pressing at a temperature in the range of 90° to 180° C., preferably 90° to 150° C. , for a period of 1 to 30 minutes, preferably 2 to 15 minutes.

The methacrylic resin compositions according to the present invention are useful for the preparation of adhesive layer resistant to heat and to solvents with excellent transparency because the compositions are comparable with syrup in permeability and in flowability. The adhesives composed of the compositions can be preferably applied for the adhesion of articles with complexed shape because of the easy-controllability of adhesive layer thickness owing to the superior flowability and easy-to-handle.

The laminated moldings with the adhesive layer according to the present invention can be molded by the compression molding, extrusion molding etc. For example, the adhesive compositions according to the present invention can be molded to prepare a laminated molding with a desired adhesive layer thickness by placing the adhesive composition on a base, heating and pressing at a temperature in the range of 90° to 180° C. , preferably 90° to 150° C. for a period of 1 to 30 minutes, preferably 2 to 15 minutes.

Thus obtained adhesive-bonded articles according to the present invention have an adhesive layer of cross-linked methacrylic resin, with superior adhesion, resistant to heat and to solvents, and with a variety of adhesive layer thickness in the range of 0.1 to 5 mm, preferably 0.3 to 3 mm.

Acrylic resins and copolymerized acrylic resins with improved resistance to solvents are preferably used as an adhesion base, and cross-linked methacrylic resins are specifically preferable. Also, other resins such as ABS resins, polycarbonate resins etc. can be used as adhesion base, because the adhesive layer according to the present invention has a sufficient adhesive strength even accompanied by a tendency of forming small bubbles at the adhesive interface.

Further the methacrylic resin compositions according to the present invention are useful for the preparation of coating layer resistant to heat and to solvents with excellent adhesion because the compositions are comparable with syrup in permeability and in flowability. The coating material composed of the compositions can be preferably applied for a coated molding with a thick coating layer because of the easy-controllability of coating layer thickness owing to the superior flowability and easy-to-handle.

The coated moldings according to the present invention can be prepared by compression molding, extrusion molding etc. For example, the coating moldings with a desired coating layer thickness can be prepared by placing the coating material on a coating base, heating and pressing at a temperature in the range of 90° to 180° C., preferably 90° to 150° C., for a period in the range of 1 to 30 minutes, preferably 2 to 15 minutes. Thus obtained coated moldings have a coating layer of cross-linked methacrylic resin, with superior adhesion to the coating base, resistant to heat and to solvents, with a coating layer thickness in the range of 0.1 to 5 mm, preferably 0.3 to 3 mm. As for a coating base, aforementioned resin sheets used as an adhesion base can also be used as a coating base.

Now, the present invention will be described more specifically below with reference to working examples. In the working examples cited below, the following methods of measurement and test are adopted.

MEASUREMENT OF POLYMER CONTENT IN PARTIALLY CROSS-LINKED POLYMER GEL

In a constant temperature water bath kept at 50° C., a soxhlet extractor containing 150 ml of dichloromethane accompanied with hydroquinone monomethyl ether in a concentration of 1000 ppm and holding 15 g of aforementioned polymer gel in strip set in a tubler filter paper for extraction is kept standing for 20 hours to effect reflux extraction. At the end of the extraction, the extract is poured in 1200 ml of methanol to separate the polymer component. The polymer so separated and the polymer remained in the tubular filter paper are combined, dried under a vacuum at 55° C. until a constant weight, and weighed. The polymer content is obtained according to the following equation:

$$\text{Polymer Content (\%)} = \frac{\text{Weight of Polymer Observed (g)}}{\text{Weight of Polymer Gel (g)}} \times 100$$

ADHESIVE STRENGTH TEST

Adhesive strength is measured in accordance with Tensile Test Method (JIS K6851) or Bending Test Method (ASTM D790). At the same time, the breaking surface is visually observed whether the debonding of adhesion interface or coated interface occurs or not.

FLOW TEST

Flowability is observed by a viscometer (Shimazu Flow Teter CFT 500 or CFT 20: manufactured by Shimizu Corp.) with a die (inner diameter of die: 1 mm, length of die: 1 mm), at a temperature of 40° C., and under a load of 10 kg/cm$^2$ or 4 kg/cm$^2$.

TACKY ADHESION TEST

Tacky adhesion is measured by a adhesion tester (Precision dynamo guage PG-10: manufactured by Marubishi Kagakukikai Seisakusho), with a testing sample prepared such that an amount of adhesive sample is inserted between a sheet of PARALINX TS-20 (Manufactured by Kuraray Co., Ltd.) and a nylon sheet and pressed under a load of 10 kg to form a adhesion layer between the two sheets with a thickness of 0.3 mm and an area of 40×40 mm.

CHEMICAL RESISTANCE

On the coated surface of a test piece of coated material, a piece of flannel impregnated with toluene, ethanol or isopropanol is set on standing for a period of 8 hours in a closed system, thereafter the surface contacted with solvent impregnated in flannel is wiped out and visually observed whether any change on the surface occurs or not.

EXAMPLE 1

To the mixture of the resin raw material and the cross-linking agent as shown in Table 1, the polymerization initiator and the polymerization regulating agent as shown in Table1 were dissolved by mixing, and the resultant mixture was poured into a cell formed by opposing two glass sheets across a space of 10 mm in thickness, and polymerized at 60° C., for 2.0 to 2.5 hours to get a partially cross-linked polymer gel. The obtained gel partial polymer was found to have the polymer content as shown in Table 1. The polymer gave a mixed dispersively or kneaded composition having a maximum particle diameter of 2 mm or less by extrusion with a screw extruder having a screw with a screw diameter of 50 mm and a ratio of L/D of 8.

Thus obtained mixed dispersively or kneaded composition and the amount of the syrup of methyl methacrylate as shown in Table 1 having the same concentration of cross-linking agent as the mixed dispersively or kneaded composition with and a viscosity of 8 poise by containing polymethyl methacrylate with a viscosity-average degree of polymerization of 10,000 were placed in a super mixer and stirred for about 5 minutes to get the methacrylic resin composition having the tacky adhesion and the improved flowability as shown in Table 1.

Then, as for molding material, 300 g of the obtained composition was formed into a dumpling, placed in a metal mold having a length of 250 mm and a width of 200 mm, preheated at 130° C., pressed for 2 minutes under the initial pressure shown in Table 1, thereafter left for standing for a period of 20 minutes under an increased pressure of 200 kg/cm$^2$, and removed from the metal mold.

During the molding, the composition flowed to produce a molded article with a good appearance, conforming exactly to the cavity of the metal mold, having a length of 250 mm, a width of 200 mm and a depth of 5 mm, without any burr.

EXAMPLE 2-10

The partially cross-linked polymer gels of various compositions were obtained using the same apparatus and conditions as Example 1, and compression molded under the same condition as Example 1 except that there was used the initial pressure as shown in Table 1 instead of the initial pressure used in Example 1 thereby obtained good appearance molded articles.

TABLE 1

| Example Number | Resin Raw Materials (Parts by Weight) | | CRA | Polym. Initiator (Parts by Weight) | | Polym. Regulator (Parts by Weight) | Polymer Content of Polymer Gel (Weight %) |
|---|---|---|---|---|---|---|---|
| | MMA | Syrup-1 | | V-70 | PH-22 | TPL | |
| 1 | 80 | — | 20 | 0.003 | 0.4 | 0.008 | 24.3 |
| 2 | 70 | — | 30 | 0.003 | 0.4 | 0.008 | 31.0 |
| 3 | — | 80 | 20 | 0.003 | 0.4 | 0.008 | 43.0 |
| 4 | 80 | — | 20 | 0.003 | 0.4 | 0.008 | 24.3 |
| 5 | 80 | — | 20 | 0.003 | 0.4 | 0.008 | 24.3 |
| 6 | 70 | — | 30 | 0.003 | 0.4 | 0.008 | 31.0 |
| 7 | 70 | — | 30 | 0.003 | 0.4 | 0.008 | 31.0 |
| 8 | — | 80 | 20 | 0.003 | 0.4 | 0.008 | 43.0 |
| 9 | — | 80 | 20 | 0.003 | 0.4 | 0.008 | 43.0 |
| 10 | 80 | — | 20 | 0.003 | 0.4 | 0.008 | 24.3 |

MMA: Methyl methacrylate monomer
Syrup 1: Methyl methacrylate syrup containing 15% by weight of polymethyl methacrylate with a viscosity-average degree of polymerization of 1300
CRA: Cross-linking agent, Neopentyl glycol dimethacrylate
Polym. Initiator: Polymerization initiator
V-70: 2,2'-Azobis(2,4-dimethyl-4-methoxyvaleronitrile)
PH-22: 2,2-Bis(t-butylperoxy)butane
Polym. Regulator: Polymerization regulating agent
TPL: 1,4(8)-p-menthadiene

| Example Number | Molding Composition (Parts by Weight) | | | Flow-ability (poise) | Tacky Adhesion (kg/cm$^2$) | Molding Condition Initial Pressure (kg/cm$^2$) |
|---|---|---|---|---|---|---|
| | MD or K | Syrup-2 | AH | | | |
| 1 | 80 | 20 | — | 1400 | 0.25 | 10 |
| 2 | 80 | 20 | — | 2000 | 0.16 | 10 |
| 3 | 70 | 30 | — | 5600 | 0.38 | 10 |
| 4 | 90 | 10 | — | 4900 | 0.20 | 10 |
| 5 | 70 | 30 | — | 520 | 0.36 | 7 |
| 6 | 90 | 10 | — | 23000 | 0.08 | 20 |
| 7 | 70 | 30 | — | 670 | 0.42 | 7 |
| 8 | 80 | 20 | — | 17000 | 0.25 | 20 |
| 9 | 90 | 10 | — | 78000 | 0.11 | 30 |
| 10 | 70 | 30 | 150 | 35000 | 0.08 | 75 |

MD or K: Mixed dispersively or kneaded composition
Syrup-2: Methyl methacrylate syrup with a viscosity of 8 poise containing polymethyl methacrylate with a viscosity-average degree of polymerization of 10000
AH: Aluminum hydroxide

EXAMPLES 11-20

240 g of the molding material compositions used in Examples 1-10 each was preformed into a batten shape having a length of 780 mm, a width of 45 mm and a depth of 7 mm, by pressing in a metal mold at room temperature, and molded under the same conditions as Example 1, except that the preformed material was placed in a metal mold having a length of 800 mm, a width of 50 mm and a depth of 30 mm instead of using the metal mold as described in Example 1, thereby obtained the results shown in Table 2. The molding material compositions each flowed and filled the whole cavity of the metal mold to get a molded article with a good appearance conforming exactly to the form of the metal mold.

TABLE 2

| Example Number | Molding Material Composition and Molding Conditions | Appearance | Total Light Transmittance (%) (ASTM D1003) |
|---|---|---|---|
| 11 | Same as Example 1 | Good | 92.8 |
| 12 | Same as Example 2 | Good | 92.7 |
| 13 | Same as Example 3 | Good | 93.0 |
| 14 | Same as Example 4 | Good | 92.7 |
| 15 | Same as Example 5 | Good | 92.8 |
| 16 | Same as Example 6 | Good | 93.1 |
| 17 | Same as Example 7 | Good | 92.8 |
| 18 | Same as Example 8 | Good | 92.6 |
| 19 | Same as Example 9 | Good | 92.8 |
| 20 | Same as Example 10 | Good | 92.7 |

COMPARATIVE EXAMPLE 1-3

The same conditions of Example 11 were used except that the molding material compositions as shown in Table 3 were used instead of the molding material composition of Example 11, thereby the molding material compositions each was intended to preform in a batten shape but it can not be accomplished because of loose state.

Accordingly, the molding material compositions each was attempted to place in the metal mold without preforming, but a part of the molding material composition overflowed from the metal mold, and the predetermined amount could not be placed in the metal mold.

COMPARATIVE EXAMPLE 4

Under the same conditions of Example 1 the molding material composition comprising 40 parts by weight of the mixed dispersively or kneaded composition of Example 1 and 60 parts by weight of aluminum hydroxide BW-103 (manufactured by Nippon Light Metal Co., Ltd.) were molded by compression molding, but the molding material composition obtained did not flow sufficiently and fill the whole eavity of the mold, and the obtained molded article had cracks all over the surface of the molded article, that is this example could not afford a complete molded article.

TABLE 3

| Comparative Example Number | Resin Raw Materials (parts by Weight) | | | Polym. Initiator (Parts by Weight) | | Polym. Regulator (Parts by Weight) | Polymer Content of Polymer Gel (Weight %) |
| --- | --- | --- | --- | --- | --- | --- | --- |
| | MMA | Syrup-1 | CRA | V-70 | PH-22 | TPL | |
| 1 | 80 | — | 20 | 0.003 | 0.4 | 0.008 | 24.3 |
| 2 | 70 | — | 30 | 0.003 | 0.4 | 0.008 | 31.0 |
| 3 | — | 80 | 20 | 0.003 | 0.4 | 0.008 | 43.0 |

MMA: Methyl methacrylate monomer
Syrup 1: Methyl methacrylate syrup containing 15% by weight of polymethyl methacrylate with a viscosity-average degree of polymerization of 1300
CRA: Cross-linking agent, Neopentyl glycol dimethacrylate
Polym. Initiator: Polymerization initiator
V-70: 2,2'-Azobis(2,4-dimethyl-4-methoxyvaleronitrile)
PH-22: 2,2-Bis(t-butylperoxy)butane
Polym. Regulator: Polymerization regulating agent
TPL: 1,4(8)-p-menthadiene

| Comparative Example Number | Molding Composition (Parts by Weight) MD or K | Flow ability (Poise) | Tacky Adhesion (kg/cm$^2$) | Molding Condition | | | |
| --- | --- | --- | --- | --- | --- | --- | --- |
| | | | | Int. P. × P. (kg/cm$^2$) | (s) | Sec. P. × P. (kg/cm$^2$) | (s) |
| 1 | 100 | 16000 | 0.00 | 30 × 120 | | 200 × 20 | |
| 2 | 100 | 100000 | 0.00 | 50 × 120 | | 200 × 20 | |
| 3 | 100 | 250000 | 0.00 | 50 × 120 | | 200 × 20 | |

MD or K: Mixed dispersively or kneaded composition
Int. P.: Initial Pressure
Sec. P.: Second Pressure
P.: Period
s: Second The molding material compositions according to Comparative Example 1-3 were non-sticky by touch test quite different from the molding material compositions of other Examples.

EXAMPLE 21

A mixture obtained by dissolving 95 parts by weight of methyl methacrylate monomer, 5 parts by weight of neopentyl glycol dimethaerylate, 0.01 parts by weight of 1,4(8)-p-menthadiene, 0.01 parts by weight of 2,2'-azobis-(4-methoxy 2,4-dimethyl valeronitrile) and 0.5 parts by weight of 2,2-bis(t-butylperoxy)butane in one another was poured into a cell built-up with two glass sheets and a gasket having a space of 10 mm in thickness and left polymerizing at 60° C. for 2 hours to get a partially cross-linked polymer gel. it was found to have a polymer content of 39.2%. The obtained polymer gel gave a mixed dispersively or kneaded composition having a maximum particle diameter of 2 mm or less with a flowability of 20,000 poise and a tacky adhesion of 0.00 kg/cm$^2$ by extrusion with a screw extruder having a screw with a screw diameter of 50 mm and a ratio of L/D of 8.

95 parts by weight of the mixed dispersively or kneaded composition and 5 parts by weight of methyl methacrylate syrup containing the same concentration of neopentyl glycol dimethaerylate as the composition, and 10% by weight of polymethyl methacrylate having a viscosity-average degree of polymerization of 10,000 and a viscosity of 10 poises were placed in a super mixer (manufactured by Kawata K. K.) and stirred for about 3 minutes, thereby obtained a methacrylic resin composition with an improved flowability and tacky adhesion.

Then, as for adhesive composition, 70 g of the obtained composition was formed as a dumpling, placed between two sheets of clear acrylic resin sheet, PARAGLAS (manufactured by Kuraray Co., Ltd.) having a length of 240 mm, a width of 190 mm and a depth of 3 mm, which was placed in a metal mold cavity having a length of 250 Mm and a width of 200 mm preheated up to 130° C., kept for standing under a pressure of 30 kg/cm$^2$, for a period of 15 minutes, thereafter the metal mold was cooled to 100° C. and the fabricated test sample was released and removed from the metal mold. The adhesive composition flowed through the gap between two acrylic resin sheets, with an adhesive layer thickness of 1 mm, without showing any flow pattern, and produced an adhesive-bonded article having excellent appearance and transparency with a total light transmittance of 92.6%. The adhesion strength test results of the obtained adhesive-bonded article observed by the method for tensile test (JIS K6851) showed the breaking of adhesion base in all cases, which confirmed that the adhesion composition had a sufficient adhesive strength.

EXAMPLE 22-26

Adhesive-bonded articles with excellent appearance were obtained by the same procedure as Example 21 except that the adhesion bases as shown in Table 4 were used instead of that used in Example 21. The adhesive-bonded articles obtained each was tested according to the same method used in Example 21. The test results are also shown in Table 4, which shows that the breakings at adhesion base were observed in all cases, which confirmed that the adhesive composition had a sufficient adhesive strength for all materials tested as Example 21.

COMPARATIVE EXAMPLE 5-8

The same procedure as Example 21 was carried out except that applying methylene chloride for solvent bonding instead of the adhesive composition of Example 21, and the method of tensile test (JIS K6851) was used for the measurement of adhesive strength as Example 21. The obtained results were shown in Table 5, but the same result of breaking at adhesion base as Example 21 was observed only in the case of using the acrylic resin sheet of PARAGLAS. In other cases, the solvent bonding to the adhesion bases were not confirmed.

TABLE 4

| Exam. No. | Adhesion Base | Adhesive Strength | Total Light Transmittance (%) |
|---|---|---|---|
| 22 | Cross-linked acrylic resin sheet PARALINX TS-20 (manufactured by Kuraray Co., Ltd.) | Breaking of Adhesion Base | 92.6 |
| 23 | Cross-linked acrylic resin sheet PARALINX TS-25 (manufactured by Kuraray Co., Ltd.) | Breaking of Adhesion Base | 92.5 |
| 24 | Acrylic resin sheet containing Lead KYOWAGLAS XA (manufactured by Kuraray Co., Ltd.) | Breaking of Adhesion Base | 88.7 |
| 25 | Polycarbonate sheet PARAMIGHTY (manufactured by Kuraray Co., Ltd.) | Breaking of Adhesion Base | — |
| 26 | ABS resin sheet SUNLOID (manufactured by Tsutsunaka Plastic Industry Co., Ltd.) | Breaking of Adhesion Base | — |

Exam. No.: Example Number

TABLE 5

| Comp. Exam. No. | Adhesion Base | Adhesive Strength (kg/cm$^2$) (JIS K6851) |
|---|---|---|
| 5 | Acrylic resin sheet: PARAGLAS | Breaking of Adhesion Base |
| 6 | Cross-linked acrylic resin sheet: PARALINX TS-20 | 0.00 (No bonding) |
| 7 | Cross-linked acrylic resin sheet: PARALINX TS-25 | 0.00 (No bonding) |
| 8 | Acrylic resin sheet containing Lead: KYOWAGLAS XA | 0.00 (No bonding) |

Comp. Exam. No.: Comparative Example Number

EXAMPLE 27-34

The same procedure as Example 21 was carried out except that the compostion ratios of monomer and catalyst as shown in Table 6 were used instead of that of Example 21, thereby obtained partially cross-linked polymer gels with various polymer contents, thereafter said polymer gels were kneaded to be adhesive compositions. According to the same procedure as Example 21, adhesive-bonded articles with excellent appearance and transparency were obtained. The adhesion strength test results for the obtained adhesive-bonded articles showed the breaking at adhesion base in all cases as equal to the case of Example 21, which confirms the adhesive compositions had sufficient adhesion strengths.

TABLE 6

| Example Number | Modif. Monom. Comp. (Parts by Weight) | | | Polymer Content of Partially Cross-linked Gel Polymer (%) | Thickness of Adhesion Layer (mm) |
|---|---|---|---|---|---|
| | MMA | NPGDM | V-70 | | |
| 27 | 99 | 1 | 0.03 | 80 | 1.1 |
| 28 | 98 | 2 | 0.018 | 70 | 1.0 |
| 29 | 90 | 10 | 0.008 | 36 | 1.1 |
| 30 | 80 | 20 | 0.003 | 29 | 1.0 |
| 31 | 70 | 30 | 0.003 | 28 | 0.8 |
| 32 | 60 | 40 | 0.002 | 31 | 1.3 |
| 33 | 50 | 50 | 0.0014 | 21 | 0.7 |
| 34 | 40 | 60 | 0.0012 | 22 | 1.0 |

Modif. Monom. Comp.: Modified Monomer Composition
MMA: Methyl methacrylate monomer
NPGDM: Neopentyl glycol dimethacrylate
V-70: 2,2'-Azobis(4-methoxy-2,4-dimethylvaleronitrile)

EXAMPLE 35-37

The same procedure as Example 21 was carried out except that the ratios of composition to syrup as shown in Table 7 were used instead of that of Example 21, thereby obtained the adhesive-bonded articles with excellent appearance and transparency. The adhesive strength test results for the obtained adhesive-bonded articles showed the breaking at adhesion base in all cases, which confirms the adhesive compositions had sufficient adhesive strengths.

TABLE 7

| Example Number | Component Ratio of Methacrylic Resin Composition (Parts by Weight) | | Flowability (Poise) | Tacky Adhesion (kg/cm$^2$) |
|---|---|---|---|---|
| | Mixed Dispersively or Kneaded Composition | Syrup | | |
| 35 | 90 | 10 | 7000 | 0.04 |
| 36 | 70 | 30 | 1000 | 0.13 |
| 37 | 50 | 50 | 150 | 0.42 |

EXAMPLE 38-41

The procedure of Example 21 was carried out except that there were used adhesive compositions having improved flowability as shown in Table 8 prepared by stirring the mixture of the mixed dispersively or kneaded composition of partially cross-linked polymer gels having a polymer content of 46% or 54%, polymerized from a monomeric mixture consisting of 80% by weight of methyl methacrylate and 20% by weight of neopentyl glycol dimethacrylate, and the methyl methacrylate syrup having a viscosity of 8 poises, containing polymethyl methacrylate with a viscosity-average degree of polymerization of 10,000 and the same concentration of cross-linking agent of the mixed dispersively or kneaded partially cross-linked polymer gel. The obtained adhesive-bonded articles had an adhesive layer thickness of 1 mm with excellent appearance and transparency.

TABLE 8

| Example Number | Polymer Content of Partially Cross-linked Polymer Gel (%) | Component Ratio of Adhesive Composition (Parts by Weight) | | Tacky Adhesion (kg/cm$^2$) |
|---|---|---|---|---|
| | | Mixed dispersively or Kneaded Composition | Syrup | |
| 38 | 46 | 80 | 20 | 0.17 |

TABLE 8-continued

| Example Number | Polymer Content of Partially Cross-linked Polymer Gel (%) | Component Ratio of Adhesive Composition (Parts by Weight) Mixed dispersively or Kneaded Composition | Syrup | Tacky Adhesion (kg/cm²) |
|---|---|---|---|---|
| 39 | 46 | 70 | 30 | 0.42 |
| 40 | 54 | 80 | 20 | 0.23 |
| 41 | 54 | 70 | 30 | 0.33 |

EXAMPLE 42

As for coating composition, 70 g of the methacrylic resin composition as used in Example 21 formed as a dumpling was placed on coating bases each as shown in Table 9 having a length of 245 mm, a width of 195 mm and a depth of 3 mm, and set in a metal mold cavity having a length of 250 mm, a width of 200 mm and a depth of 30 mm, preheated up to 130° C., kept for standing under a pressure of 30 kg/cm², for a period of 10 minutes, thereafter the metal mold was cooled to 100° C., and the coated article was released and removed from the metal mold. The coating composition flowed over the coating bases having a coating thickness of about 1 mm, thereby formed coated articles with excellent appearance and transperency without showing any flow pattern of coating material.

The test results of adhesive strength and of resistance to chemicals of the obtained coated articles are shown in Table 9, which confirms that coated articles each had a sufficient adhesive strength and excellent resistance to chemicals, and no debonding on coating interface.

TABLE 9

| Coating Base | Adhesive Strength (kg/cm²) | Resistance to Chemicals |
|---|---|---|
| Acrylic resin sheet (Kuraray Co., Ltd.: PARAGLAS) | 1200 | No change on appearance |
| ABS resin sheet (Tsutsunaka Plastic Industry Co., Ltd.: SUNLOID) | 890 | No change on appearance |
| Cross-linked acrylic resin sheet Kuraray Co., Ltd.; PARALINX TS-20) | 1200 | No change on appearance |
| Acrylic resin sheet containing lead (Kuraray Co., Ltd.: KYOWAGLAS XA) | 710 | No change on appearance |

EXAMPLES 43-45

As for coating composition, 70 g of methacrylic resin compositions as used in Example 35-37 each was formed in a dumpling, placed on a clear acrylic resin sheet base (PARAGLAS: manufactured by Kuraray Co., Ltd.) having a length of 245 mm, a width of 195 mm and a depth of 3 mm, and which was set in a metal mold eavity having a length of 250 mm, a width of 200 mm and a depth of 30 mm, preheated up to 130° C., kept for standing under a pressure of 30 kg/cm² for a period of 10 minutes, thereafter the metal mold was cooled to 100° C., and the coated article was released and removed from the metal mold. The obtained articles each had excellent appearance and transperency and a coating layer of about 1 mm. The test results of adhesive strength and resistance to chemicals of the coated articles each confirmed a sufficient adhesive strength and resistance to chemicals with no debonding at coating interface.

EXAMPLES 46 AND 47

A mixed dispersively or kneaded composition of partially cross-linked polymer gel consisting of a mixture of 90% by weight of methyl methacrylate and 10% by weight of neopentyl glycol dimethacrylate, containing a polymer content of 46%, and a syrup of methyl methacrylate having a viscosity of 8 poises, containing polymethyl methacrylate with a viscosity-average degree of polymerization of 10,000 and the same concentration of cross-linking agent as the composition were placed in a super mixer at the ratios shown in Table 10 and stirred for a period of about 5 minutes, thereby obtained flowability improved compositions as shown in Table 10.

The obtained coating compositions each was placed on an acrylic resin coating base, and which was pressed according to the procedure of Example 42. The obtained coated articles each had excellent appearance and transperency with a coated layer having a thickness of about 1 mm.

TABLE 10

| Example Number | Polymer Content of Partially Cross-linked Polymer Gel (%) | Component Ratio of Coating Composition (Parts by Weight) Mixed dispersively or Kneaded | Syrup | Flowability (poise) |
|---|---|---|---|---|
| 46 | 46 | 80 | 20 | 2000 |
| 47 | 46 | 70 | 30 | 600 |

EXAMPLE 48-51

An amount of mixed dispersively or kneaded partially cross-linked polymer gel having a composition as shown in Table 11, and an amount of syrup of methyl methacrylate having a viscosity of about 10 poises containing 10% by weight of polymethyl methacrylate with a viscosity-average degree of polymerization of 10,000 were placed in a super mixer at the ratios as shown in Table 11, and stirred for about 10 minutes, thereby obtained tacky adhesive and flowability improved composition. The obtained compositions each, in a string-like shape having about the same length of the resin sheet, was placed on a clear acrylic resin sheet of continuous length (PARAGLAS: manufactured by Kuraray Co., Ltd.) having a length of 696 mm, a width of 62 mm and a depth of 3 mm, and which was placed in a metal mold having a length of 700 mm, a width of 65 mm and a depth of 30 mm, preheated up to 130° C., left for standing under a pressure of 40 kg/cm² for a period of 10 minutes. The metal mold was cooled to about 100° C. and from which the coated article was released and removed from the metal mold.

The coating compositions each flowed thoroughly into detailed parts. The obtained coated articles each had a coated layer of about1 mm with excellent appearance and transperency, and with no flow pattern. The coated articles each also had a sufficient adhesive strength and resistance to chemicals on the coated surface.

TABLE 11

| Example Number | Partially Cross-linked Polymer Gel Composition | | | Coating Composition (Parts by Weight) | | |
|---|---|---|---|---|---|---|
| | Monomer Composition (Parts by Wt.) | | Polymer Content (%) | Mixed dispersively or Kneaded Composition | Syrup | Flowability (poise) |
| | MMA | NPGDM | | | | |
| 48 | 98 | 2 | 60 | 70 | 30 | 1800 |
| 49 | 80 | 20 | 25 | 80 | 20 | 1500 |
| 50 | 80 | 20 | 38 | 80 | 20 | 15000 |
| 51 | 70 | 30 | 31 | 70 | 30 | 4500 |

MMA: Methyl methacrylate
NPGDM: Neopentyl glycol dimethacrylate
Parts by Wt.: Parts by Weight

COMPARATIVE EXAMPLE 9

A partially cross-linked polymer gel having a polymer content of 82% was prepared according to the procedure of Example 21 except that 90 parts by weight of methyl methacrylate, 10 parts by weight of neopentyl glycol dimethacrylate and 0.001 parts by weight of 1,4(8)-p-menthadiene were used as the monomeric components instead of the monomer components used in Example 21.

The partially cross-linked polymer gel was mixed dispersively or kneaded by a cutter mill having a maximum particle size of 2 mm or less, thereafter coated on an acrylic resin sheet by the same procedure as described in Example 42. But the coating composition did not flow until the ends, and also a flow pattern was observed. The adhesive strength of the coated article measured by the bending method showed insufficient adhesive strength debonding from the adhesion interface.

COMPARATIVE EXAMPLE 10

The same procedure as Example 21 was carried out except that 0.55 parts by weight of 1,4(8)-p-menthadiene instead of the amount used in Example 21, thereby obtained a polymer having a polymer content of 2.8%. The polymer did not have sufficient shape-retaining properties, but was placed on an acrylic resin sheet and carried out the coating procedure as described in Example 42.

But the most part of the coating composition overflowed from the metal mold. The coated article removed from the metal mold had a very thin coating layer partly on the coating base, and also the coating layer was not sufficiently cured.

COMPARATIVE EXAMPLE 11

The mixed dispersively or kneaded partially cross-linked polymer gel obtained according to Examples 49, 50 and 51 each was coated on a clear acrylic base of continuous length having a length of 696 mm, a width of 62 mm and a depth of 3 mm without improving adhesion and flowability by stirring with syrup. The coating compositions each was intended to form in a string-like shape having about the same length of the resin base in length, but it cannot be accomplished because of non-sticky properties of the composition.

Accordingly, the coating compositions each was tried to place on a resin base in loose state, and to put in a metal mold, but a part of the composition overflowed and the predetermined amount could not be put in the metal mold because the base has a narrow width and a length of continuous length.

For the above mention situation, the coated articles each had incomplete coating with partly uncovered and insufficient appearance.

What is claimed is:

1. A methacrylic resin composition having a tacky adhesion of 30 to 900 g/cm$^2$ and comprising:
   100 parts by weight of a partially crosslinked polymer gel obtained by partially polymerizing a mixture comprising:
   (A) 40 to 99% by weight of an unsaturated monomer consisting essentially of an alkyl methacrylate and
   (B) 60 to 1% by weight of a crosslinking agent containing at least two (meth)acryloyl groups in the molecule thereof,
   the total polymer content of said polymer gel being kept from exceeding 80% by weight and increased by 4 to 62% by weight over the polymer content of said mixture, and
   1 to 100 parts by weight of a syrup that principally contains an alkyl methacrylate and contains its polymer dissolved therein.

2. A composition according to claim 1, wherein said syrup contains a cross-linking agent having the same concentration as the partially cross-linked polymer gel.

3. A composition according to claim 1, wherein the cabon number of the alkyl group of said alkyl methacrylate is 1 to 4.

4. A composition according to claim 3, wherein said alkyl methacrylate is methyl methacrylate.

5. A composition according to claim 1 or 2, wherein said cross-linking agent is a monomer containing at least two (meth)acryloyl groups in the molecular unit thereof and having 10 or less carbon atoms between any two of said (meth)acryloyl groups.

6. A composition according to claim 5, wherein said cross-linking agent is a compound represented by a general formula:

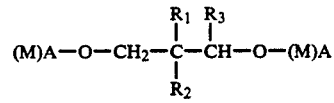

wherein R$_1$ denotes H, CH$_3$, C$_2$H$_5$, or CH$_2$OH, R$_2$ denotes H, CH$_3$,

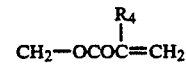

(wherein R$_4$ denotes H or CH$_3$) or CH$_2$OH, R$_3$ denotes H or CH$_3$, R$_1$, R$_2$ and R$_3$ do not denote hydrogen atom all at the same time, and (M)A denotes a methacryloyl group or acryloyl group.

7. A composition according to claim 6, wherein said cross-linking agent is 2,2-dimethylol propane dimethacrylate.

8. A molding material comprising said composition according to claim 1.

* * * * *